US012639091B2

(12) United States Patent
Wigglesworth et al.

(10) Patent No.: US 12,639,091 B2
(45) Date of Patent: May 26, 2026

(54) PROBE DEPLOYMENT

(71) Applicant: INTERNATIONAL BUSINESS MACHINES CORPORATION, Armonk, NY (US)

(72) Inventors: Joseph Paul Wigglesworth, Thornhill (CA); Yar Rouf, Toronto (CA); Joydeep Mukherjee, San Luis Obispo, CA (US); Marin Litoiu, Toronto (CA); Ian Fraser Watts, Stouffville (CA); Eugen Postea, Thornhill (CA); Radu Bogdan Mateescu, Markham (CA)

(73) Assignee: International Business Machines Corporation, Armonk, NY (US)

( * ) Notice: Subject to any disclaimer, the term of this patent is extended or adjusted under 35 U.S.C. 154(b) by 652 days.

(21) Appl. No.: 17/575,704

(22) Filed: Jan. 14, 2022

(65) Prior Publication Data

US 2023/0229469 A1      Jul. 20, 2023

(51) Int. Cl.
| *G06F 9/455* | (2018.01) |
| *G06N 20/00* | (2019.01) |

(52) U.S. Cl.
CPC ......... *G06F 9/45558* (2013.01); *G06N 20/00* (2019.01); *G06F 2009/45591* (2013.01); *G06F 2009/45595* (2013.01)

(58) Field of Classification Search
None
See application file for complete search history.

(56) References Cited

U.S. PATENT DOCUMENTS

| 7,865,888 | B1 | 1/2011 | Qureshi et al. |
| 9,122,562 | B1 | 9/2015 | Stickle |
| 9,231,844 | B2 | 1/2016 | Tychon et al. |
| 2015/0378763 | A1* | 12/2015 | Hassine ................... G06F 9/50 |
| | | | 718/1 |
| 2017/0331907 | A1 | 11/2017 | Jagannath et al. |
| 2018/0288129 | A1 | 10/2018 | Joshi et al. |
| 2020/0195509 | A1 | 6/2020 | Singh et al. |
| 2020/0225926 | A1* | 7/2020 | Kammath ............. G06F 9/5083 |
| 2020/0293349 | A1* | 9/2020 | Vaughn ................. G06N 20/00 |
| 2020/0329464 | A1* | 10/2020 | Madapoosi Sampath ................... |
| | | | G06F 9/5005 |

(Continued)

FOREIGN PATENT DOCUMENTS

CN          112084040          12/2020

OTHER PUBLICATIONS

Bellavista, "How to Monitor and Control Resource Usage in Mobile Agent Systems," Sep. 2001, Proceedings 3rd International Symposium on Distributed Objects and Applications, IEEE, pp. 65-75 (Year: 2001).*

(Continued)

*Primary Examiner* — Bradley A Teets
*Assistant Examiner* — Melissa A Headly
(74) *Attorney, Agent, or Firm* — Seed Intellectual Property Law Group LLP

(57) ABSTRACT

A method includes generating, by a computing device, a probe; deploying, by the computing device, the probe into a virtual machine hosting a cloud application; increasing, by the computing device, resource consumption by the probe; collecting, by the computing device, performance data from the cloud application; and training, by the computing device, a machine learning model using the performance data.

17 Claims, 6 Drawing Sheets

(56) References Cited

U.S. PATENT DOCUMENTS

| | | | | |
|---|---|---|---|---|
| 2021/0152414 A1* | 5/2021 | Busbee | .................. | H04L 63/08 |
| 2021/0382725 A1* | 12/2021 | Vemula | ................. | G06F 9/4494 |
| 2023/0135013 A1* | 5/2023 | Wang | ........................ | G06F 8/65 |
| | | | | 718/102 |

OTHER PUBLICATIONS

Bellavista et al. ("How to Monitor and Control Resource Usage in Mobile Agent Systems," Proceedings 3rd International Symposium on Distributed Objects and Applications, Sep. 2001, IEEE, pp. 65-75) (Year: 2001).*

Mell et al., "The NIST Definition of Cloud Computing", NIST, Special Publication 800-145, Sep. 2011, 7 pages.

Anonymous, "A method to optimize applications' deployment on a distributed system", IP.com, IPCOM000262507D, Jun. 8, 2020, 4 pages.

Akbulut et al., "Performance Analysis of Microservice Design Patterns", IEEE Computer Society, IEEE Internet Computing, 2019, 9 pages, vol. 23, No. 6.

Bao et al., "Performance Modeling and Workflow Scheduling of Microservice-Based Applications in Clouds", IEEE Transactions on Parallel and Distributed Systems, 2019, 16 pages, vol. 30, No. 9.

Jindal et al., "Performance Modeling for Cloud Microservice Applications", Session 2: Cloud Computing, ACM/SPEC International Conference on Performance Engineering in Mumbai, India (ICPE'19), 2019, 8 pages.

Khazaei et al., "Efficiency Analysis of Provisioning Microservices", 2016, IEEE 8th International Conference on Cloud Computing Technology and Science (CloudCom), 9 pages.

Khazei et al., "Performance Modeling of Microservice Platforms", 2020, IEEE Transactions on Cloud Computing, vol. XX, No. X, 14 pages.

Moradi et al., "ConMon: An Automated Container Based Network Performance Monitoring System", 2017, IFIP/IEEE Symposium on Integrated Network and Service Management, 9 pages.

Moradi et al., "Adaptive Performance Modeling and Prediction of Applications in Multi-Tenant Clouds", 2019, IEEE 21st International Conference on High Performance Computing and Communications; IEEE 17th International Conference on Smart City; IEEE 5th International Conference on Data Science and Systems, 8 pages.

Rahman et al., "Predicting the End-to-End Tail Latency of Containerized Microservices in the Cloud", 2019, IEEE International Conference on Cloud Engineering, 11 pages.

Strube et al., "Software Probes: A Method for Quickly Characterizing Applications' Performance on Heterogeneous Environments", 2009, International Conference on Parallel Processing Workshops, 8 pages.

Ueda et al., "Workload Characterization for Microservices", 2016, IEEE International Symposium on Workload Characterization, 10 pages.

Viktorin et al., "Network Monitoring Probe Based on Xilinx Zynq", Proceedings of the Tenth ACM/IEEE Symposium on Architectures for Networking and Communications Systems (Los Angeles, CA, USA) (ANCS '14), Association for Computing Machinery, New York, NY, 2014, 2 pages.

* cited by examiner

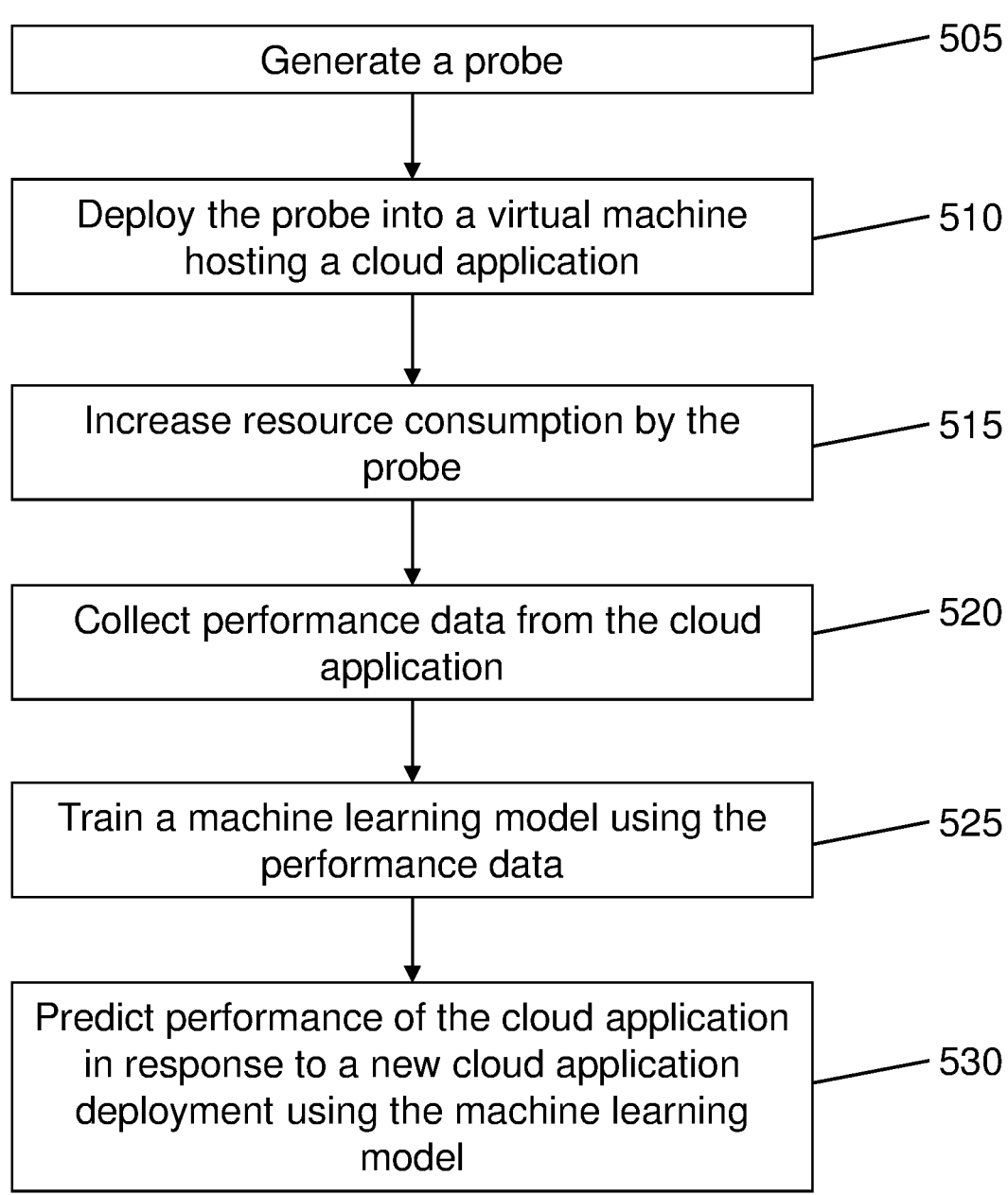

| Generate a probe | 505 |

| Deploy the probe into a virtual machine hosting a cloud application | 510 |

| Increase resource consumption by the probe | 515 |

| Collect performance data from the cloud application | 520 |

| Train a machine learning model using the performance data | 525 |

| Predict performance of the cloud application in response to a new cloud application deployment using the machine learning model | 530 |

FIG. 5

PROBE DEPLOYMENT

BACKGROUND

Aspects of the present invention relate generally to software containers and, more particularly, to probe deployment.

A container is a stand-alone executable package of a piece of software that includes everything for running the software, including application code, runtime, system tools, system libraries, and settings. Containers are lightweight and include layers of filesystems, e.g., sharing common files, making disk usage and image downloads efficient. Containers run in various environments, including but not limited to a local computing device (e.g., a desktop or a laptop), physical or virtual machines in a data center, and cloud providers.

SUMMARY

In a first aspect of the invention, there is a computer-implemented method including: generating, by a computing device, a probe; deploying, by the computing device, the probe into a virtual machine hosting a cloud application; increasing, by the computing device, resource consumption by the probe; collecting, by the computing device, performance data from the cloud application; and training, by the computing device, a machine learning model using the performance data.

In another aspect of the invention, there is a computer program product including one or more computer readable storage media having program instructions collectively stored on the one or more computer readable storage media. The program instructions are executable to: generate a probe; deploy the probe into a virtual machine hosting a cloud application; increase resource consumption by the probe; collect performance data from the cloud application; train a machine learning model using the performance data; and predict performance of the cloud application in response to a new cloud application deployment using the machine learning model.

In another aspect of the invention, there is system including a processor, a computer readable memory, one or more computer readable storage media, and program instructions collectively stored on the one or more computer readable storage media. The program instructions are executable to: generate a probe; deploy the probe into a virtual machine hosting a cloud application; increase resource consumption by the probe; collect performance data from the cloud application; remove the probe from the virtual machine; train a machine learning model using the performance data; and predict performance of the cloud application in response to a new cloud application deployment using the machine learning model.

BRIEF DESCRIPTION OF THE DRAWINGS

Aspects of the present invention are described in the detailed description which follows, in reference to the noted plurality of drawings by way of non-limiting examples of exemplary embodiments of the present invention.

FIG. 5 shows a flowchart of an exemplary method in accordance with aspects of the invention.

DETAILED DESCRIPTION

Figure 1:
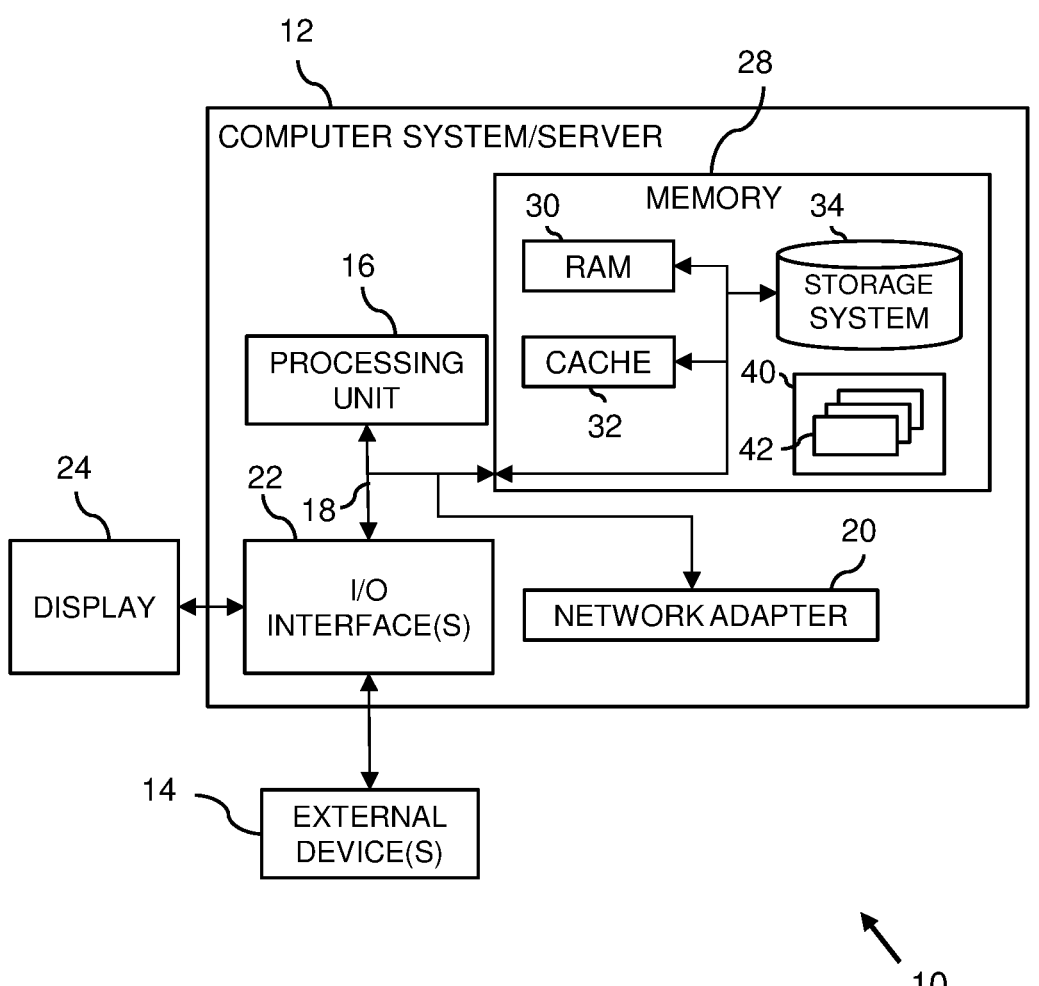
FIG. 1 depicts a cloud computing node according to an embodiment of the present invention.

Aspects of the present invention relate generally to software containers and, more particularly, to probe deployment. According to aspects of the invention, a system deploys a probe to a virtual machine hosting a cloud application. In embodiments, the system increases consumption of resources by the probe until a resource consumption threshold is met. In embodiments, as the resource consumption occurs, the system collects performance data from the cloud application and builds a machine learning model. In embodiments, the system then uses the machine learning model to predict performance of the cloud application at relatively higher resource consumption levels. In this manner, implementations of the invention allow for a prediction of cloud application performance without incurring a relatively high overhead on the virtual machine and without the necessity of deploying the new application which will be more complex and more difficult to deploy than the probe.

In embodiments, there is a computer-implemented process for quantifying an impact of a container deployment, the computer-implemented process includes in response to a deployment by a probe orchestrator of a tunable probe on a virtual machine where a cloud-native application is deployed, initializing the tunable probe as a microservice deployed as a container in the cloud environment managed using a web interface by the probe orchestrator. In embodiments, the computer-implemented process includes in response to initializing the tunable probe, receiving first information including resource consumption values for a first resource consumption level of the tunable probe by the probe orchestrator. In embodiments, the computer-implemented process includes receiving additional information including performance metric of an existing cloud application while the tunable probe is running at first resource consumption level of the tunable probe by the probe orchestrator. In embodiments, the computer-implemented process includes incrementally increasing the first resource consumption level of the tunable probe by a predetermined amount at a predetermined time until a predetermined threshold of a probe resource consumption is attained. In embodiments, the computer-implemented process includes collecting all information associated with each different level of the probe resource consumption. In embodiments, the computer-implemented process includes generating, by the probe orchestrator, a performance model in response to receiving a collection of all information, by inserting the resource consumption values and the performance metric into a model builder by the probe orchestrator. In embodiments, the computer-implemented process includes determining an accuracy of the performance model for a particular performance indicator. In embodiments, in response to a determination the performance model for the particular performance indicator is not accurate, using predetermined criteria, re-tuning the probe resource consumption values, until accuracy of the performance model meets predetermined requirements. In embodiments, in response to a determination that the performance model for the particular performance indicator is accurate, using the performance model to determine an impact of the particular performance indicator of a new microservice resource consumption on existing cloud microservices.

Aspects of the invention provide an improvement in the field of cloud computing by providing a technical solution to the problem of cloud application deployment on virtual machines hosting existing cloud applications. In embodiments, the technical solution involves the steps of: a) generating a probe; b) deploying the probe into a virtual machine hosting a cloud application; c) increasing resource consumption by the probe; d) collecting performance data from the cloud application; e) training a machine learning model using the performance data; and f) predicting performance of the cloud application in response to a new cloud application deployment using the machine learning model. These steps allow for prediction of a cloud application performance in response to a new application deployment without the virtual machine having to incur a relatively high overhead and without the necessity of deploying the new application which will be more complex and more difficult to deploy than the probe. In this way, a benefit of deploying the probe instead of an actual cloud application is a reduction in resource usage since the probe does not contain the microservices which the cloud application utilizes to run.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
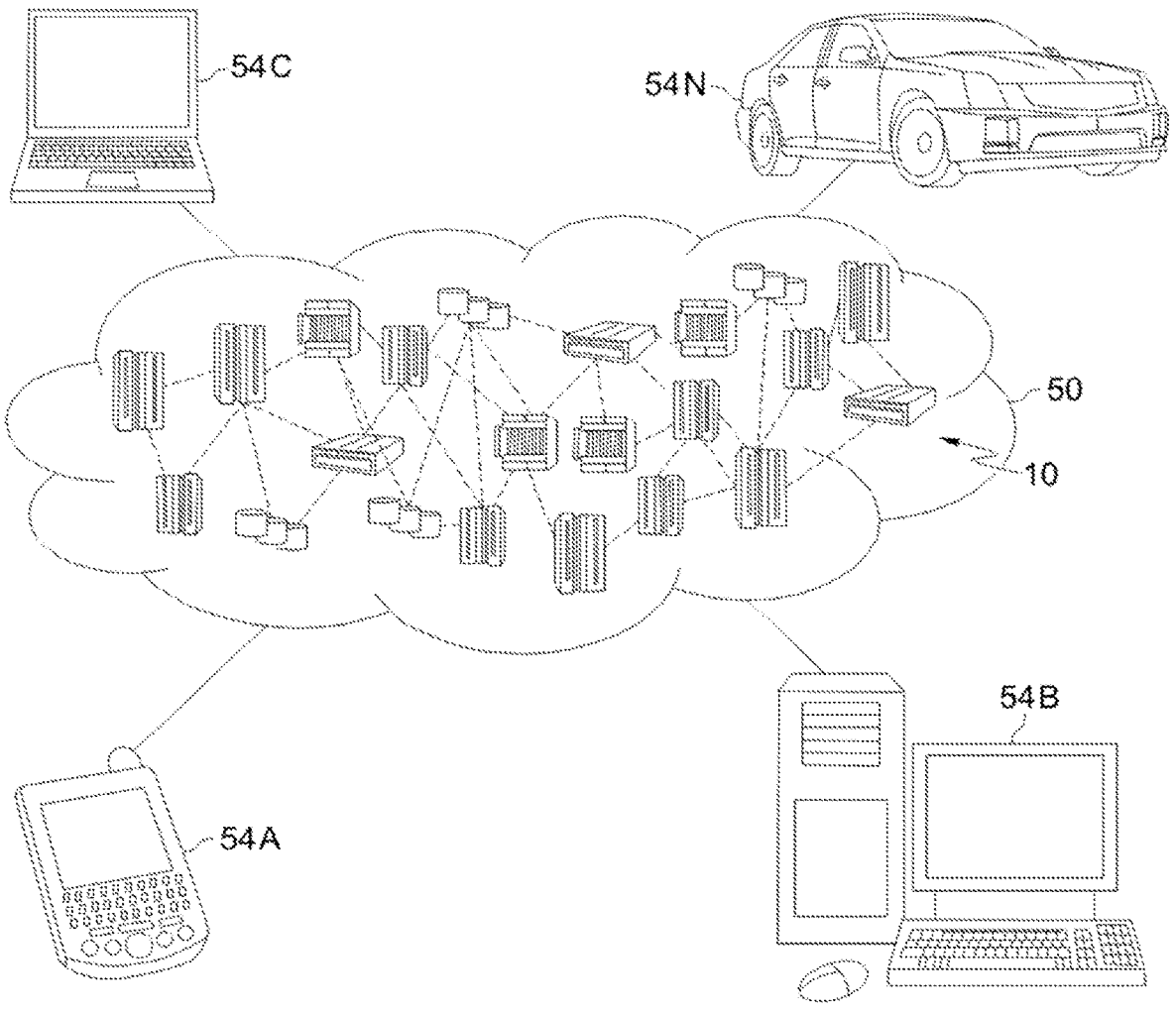
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
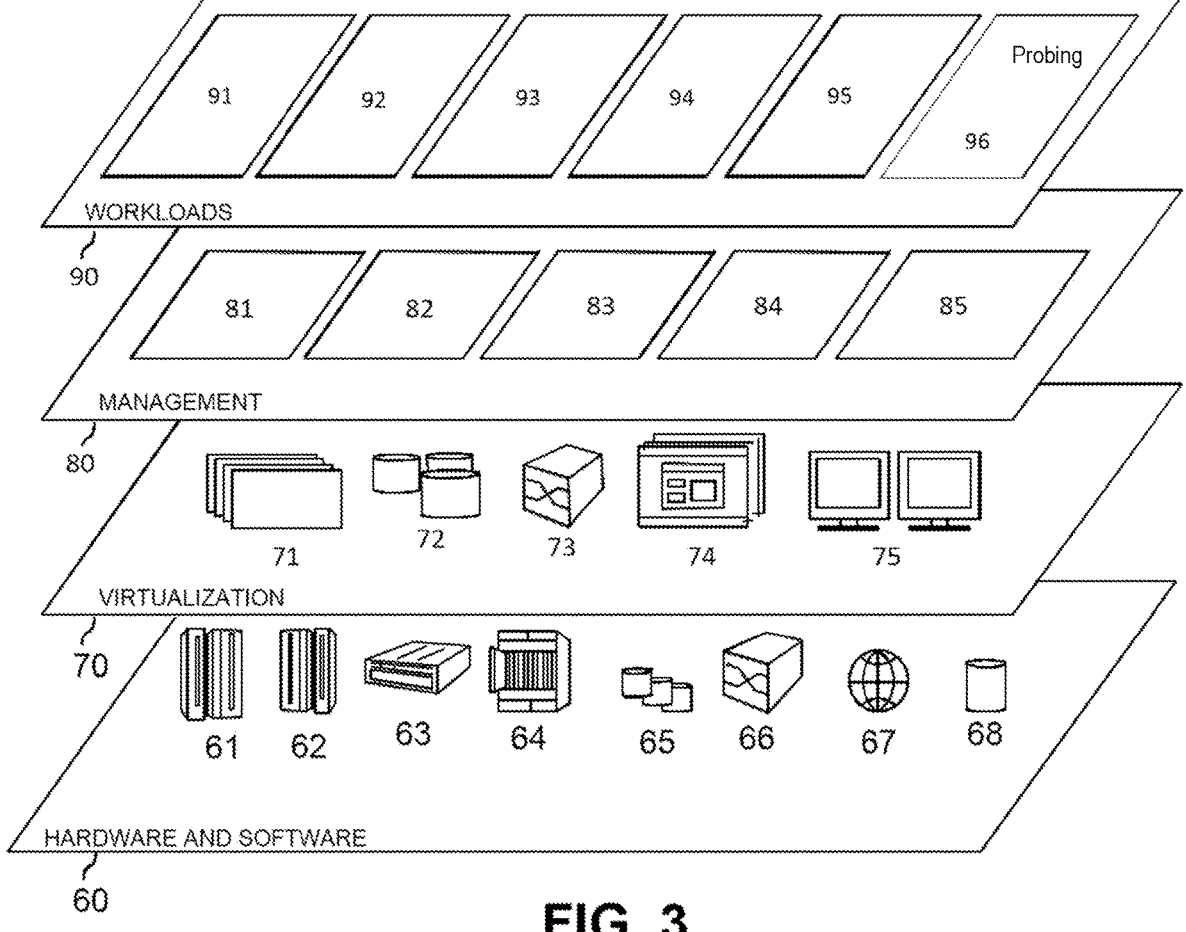
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and probing 96.

Implementations of the invention may include a computer system/server 12 of FIG. 1 in which one or more of the program modules 42 are configured to perform (or cause the computer system/server 12 to perform) one of more functions of the probing 96 of FIG. 3. For example, the one or more of the program modules 42 may be configured to: a) generate a probe; b) deploy the probe into a virtual machine hosting a cloud application; c) increase resource consumption by the probe; d) collect performance data from the cloud application; e) train a machine learning model using the performance data; and f) predict performance of the cloud application in response to a new cloud application deployment using the machine learning model.

Figure 4:
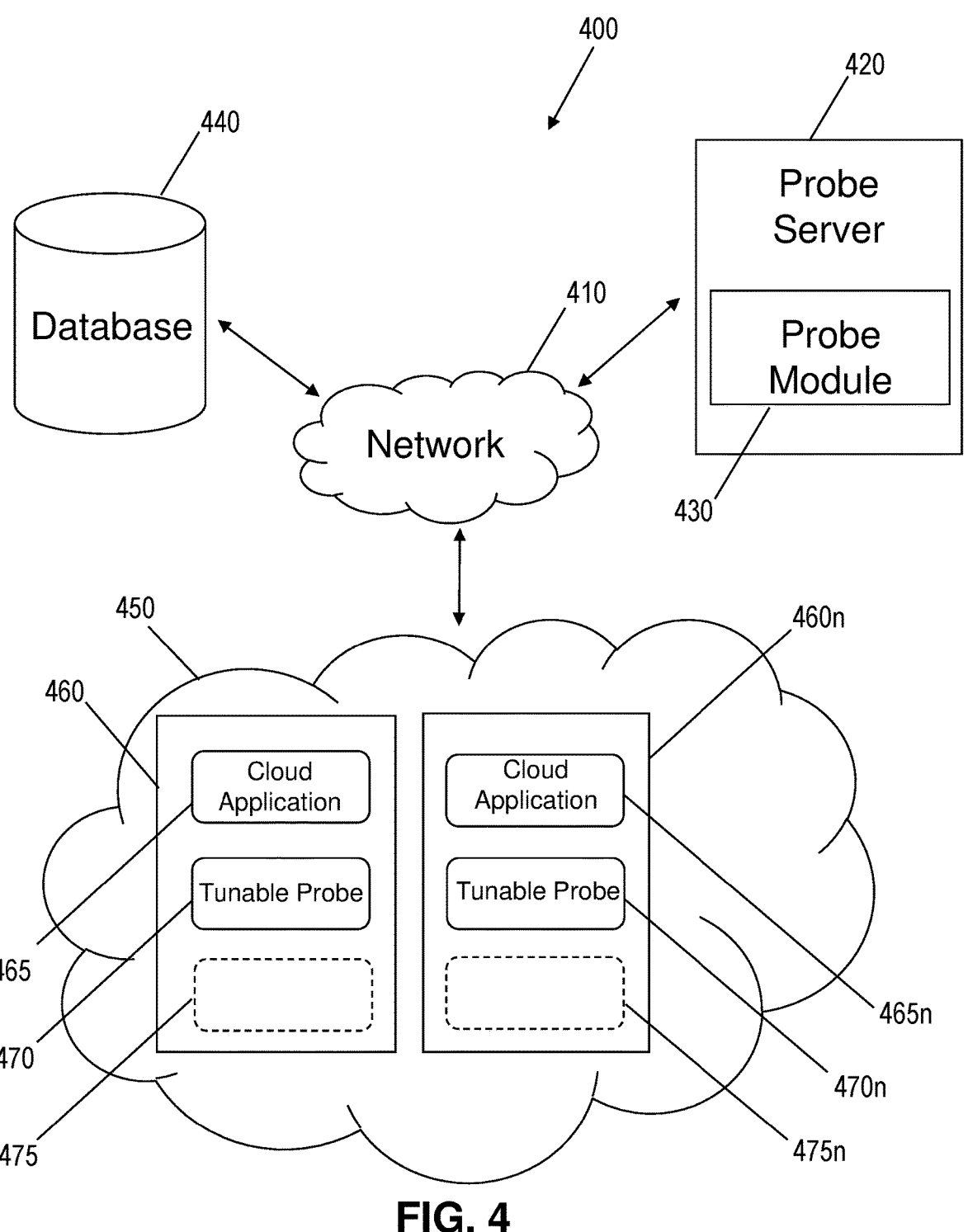
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 410, a probe server 420, a database 440, and a cloud environment 450.

In embodiments, the cloud environment 450 includes virtual machines 450, 450n. In embodiments, each virtual machine of the virtual machines 460, 460n include one or more components of the computer system 12 of FIG. 1. In embodiments, the virtual machines 460, 460n may be run on a laptop computer, a desktop computer, and/or a server, for example. In embodiments, the cloud environment 450 includes any number of virtual machines, e.g., five virtual machines.

In embodiments, each virtual machine of the virtual machines 460, 460n hosts a cloud application of the cloud applications 465, 465n. In embodiments, the cloud applications 465, 465n are cloud-native applications composed of microservices and deployed by multiple containers. In this way, the containers deploy the cloud applications 465, 465n and use the virtual machines 460, 460n as a host operating system. Examples of a cloud application of the cloud applications 465, 465n include an online shopping application, a streaming application, and a word processing application, amongst other examples. In embodiments, potential cloud applications 475, 475n are applications a cloud operator of the cloud environment 450 desires to deploy in the cloud environment 450. In embodiments, each virtual machine of the virtual machines 460, 460n hosts any number of the cloud applications 470, 470n. For example, as shown in FIG. 4, the virtual machine 460 hosts a single cloud application 465.

In embodiments, the probe server 420 is a computing device, such as the computer system/server 12 of FIG. 1. In embodiments, the probe server 420 includes a probe module 430, which comprises one or more program modules such as program modules 42 described with respect to FIG. 1. In embodiments, the probe server 420 includes additional or fewer modules than those shown in FIG. 4. In embodiments, separate modules may be integrated into a single module. Additionally, or alternatively, a single module may be implemented as multiple modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

The network 410 comprises one or more computer networks, such as one or more of a LAN, WAN, and the Internet. In one embodiment, the network 410 is representative of a cloud computing environment, such as described in FIG. 2.

In embodiments, a cloud application of the cloud applications 465, 465n affects performance of the microservices of an existing cloud application being run on a virtual machine of the virtual machines 460, 460n. In embodiments, performance issues the existing cloud application experiences include an increase in response time, amongst other performance issues. In embodiments, without being aware of the effects to the performance of the existing cloud applications, a cloud operator of the cloud environment 450 can cause unnecessary or unacceptable performance impacts on the cloud environment 450, especially for an end-user of the cloud environment 450. In embodiments, another issue is that the cloud operator may be unable to optimize deployments of the microservices within the cloud environment 450. As an example, when an existing virtual machine of the virtual machines 465, 465n is unable to handle the microservices of the container to be within performance guidelines of the service level agreement (SLA) of the container, the cloud operator deploys a new virtual machine to deploy the microservices.

In embodiments, by determining the performance impact, a cloud operator has relatively more information to optimize the placement of the containers in the cloud environment 450. In embodiments, one approach to determine the impact of a new cloud application deployment on a virtual machine hosting an existing cloud application of the cloud applications 465, 465n is to deploy the actual application, collect metrics, and build the performance model. However, by deploying the actual cloud application on the cloud environment 450 to collect the data, the cloud environment 450 incurs unnecessary overhead, i.e., resource consumption.

In embodiments, to solve these challenges, the probe module 430 uses tunable probes 470, 470n on the cloud environment 450 to collect performance data of existing cloud applications at runtime. In embodiments, a probe of the tunable probes 470, 470n is software which mimics a cloud application by having similar performance parameters as the cloud application the probe is mimicking, without having to run all the microservices the cloud application would run on the virtual machine upon deployment of the cloud application. In embodiments, the cloud application the probe is mimicking is a cloud application a cloud operator desires to deploy in the cloud environment 450. In this way, each probe of the probes 470, 470*n* mimics a cloud application at runtime. The benefit of deploying the probe instead of an actual cloud application is a reduction in resource usage since the probe does not contain the microservices which the cloud application utilizes to run. In this way, the probe uses less resources than an actual cloud application, thereby reducing a resource usage overhead for the virtual machine of the virtual machines. In embodiments, the performance data is fed into a model builder to build a performance model at runtime. As an example, a probe of the probes 470, 470*n* mimics a streaming application in a virtual machine of the virtual machines 465, 465*n,* while another probe of the probes 470, 470*n* mimics a word processing application in another virtual machine of the virtual machines 465, 465*n*. In further embodiments, each probe of the probes 470, 470*n* mimics a same cloud application, e.g., probes 470, 470*n* mimic a streaming application. In embodiments, the probe module 430 deploys any number of the probes 470, 470*n*.

In embodiments, the probe module 430 generates a probe of the probes 470, 470*n* using a service level agreement (SLA) of the cloud application a cloud operator desires to deploy in the cloud environment 450. In embodiments, an SLA indicates performance parameters of a cloud application. In embodiments, the probe module 430 generates the probe by adjusting the software that represents the probe to have the same performance parameters as the cloud application using the performance parameters defined in the SLA. As an example, an SLA indicates that a cloud application utilizes a specific number of processors of a virtual machine of the virtual machines 465, 465*n*. As a more specific example, an SLA indicates that the cloud application utilizes 25% of the processors of a virtual machine of the virtual machines 465, 465*n*.

In embodiments, in response to generating a probe of the probes 470, 470*n,* the probe module 430 deploys the probe as a container into a virtual machine of the virtual machines 465, 465*n*. As shown in FIG. 4, the probe module 430 deploys the probe 470 into the virtual machine 465 to mimic a new cloud application running in the virtual machine 465. In embodiments, by deploying the probe 470 into the virtual machine 465, the probe 470 begins to consume resources of the virtual machine 465, which mimics runtime of the potential cloud application 475. In embodiments, the probe deployment is periodic, amongst other examples.

In embodiments, the probe module 430 utilizes a deployment engine to deploy the probe 470. In embodiments, the deployment engine is an Infrastructure-as-Code (IaC) engine, which describes a probe of the probes 470, 470*n* through a relatively high-level computer programming language. In embodiments, the probe module 430 deploys or removes the probes 470, 470*n* using IaC commands. In embodiments, deployment of a probe of the probes 470, 470*n* is automatic and/or autonomous. In embodiments, the probe module 430 through the deployment engine utilizes rules and SLA requirements to automate the probe deployment of the probes 470, 470*n*. An example of a simple rule is deploying a probe of the probes 470, 470*n* based on a predefined period of time lapsing. In embodiments, the predefined period of time is configurable. In this way, the probe module 430 deploys a probe of the probes 470, 470*n* based on rules.

In embodiments, after deploying the probe 470, the probe module 430 increases (tunes) resource consumption values, which may have a designation as (r1 . . . rn) by the probe 470 until a threshold is met. In embodiments, r1 represents a first resource consumption value, and so on. In embodiments, the threshold represents a relatively lower level consumption of resources of the virtual machine 465. More specifically, the threshold is a percentage of a resource consumption value defined in a service level agreement (SLA). As an example, a threshold is 20% of an amount of processor power of the virtual machine, as defined in the SLA. In this way, the probe module 430 keeps a performance overhead of the virtual machine 465 relatively low, thereby not affecting performance of the cloud application 470 to an end user.

In embodiments, the probe module 430 increases the resource consumption values r1 . . . rn by the probe 470 incrementally. In embodiments, the probe module 430 increases the resource consumption values r1 . . . rn by the probe 470 incrementally after an amount of time (t). In embodiments, an example of incremental increasing resource consumption values r1 . . . rn is shown as rn+1, with rn representing a resource consumption value. In embodiments, the probe module 430 increases the resource consumption by the probe 470 by using a web-based application programming interface (API). In embodiments, values for the resource consumption values r1 . . . rn by a probe of the probes 470, 470 have a designation of r1 . . . rn. In embodiments, r1, r2 . . . rn are the resource variables such as the CPU utilization or memory demand.

In embodiments, the probe module 430 collects performance data from the virtual machine 460 with respect to the cloud application 465 as the probe 470 consumes resources of the virtual machine 460. In embodiments, the performance data includes processor usage of the virtual machine 460, memory usage of the virtual machine 460, and response time of the cloud application 465. In embodiments, the probe module 430 collects performance data from a cloud application of the cloud applications 465, 465*n* through a web-based API.

In embodiments, the performance data of a cloud application of the cloud applications 465, 465*n* has a designation of (pn), with pn representing a performance of a cloud application of the cloud applications 465, 465*n* in view of the resource consumption values, e.g., r1. In embodiments, the probe module 430 collects the performance data pn while the probe of the probes 470, 470*n* are running at a resource consumption value, e.g., rn. In embodiments, the probe module 430 increases the resource consumption values r1 . . . rn incrementally until the threshold is met, i.e., rn=resource consumption threshold. In embodiments, the probe module collects the performance data through the network 410. In this way, the probe module 430 sends a constant workload of the resource consumption values r1 . . . rn on the virtual machine 460 and collects the performance data values p1 . . . pn.

In embodiments, in response to collecting the performance data, the probe module 430 removes the probe 470 from the virtual machine 460. In embodiments, the probe module 430 removes the probe 470 using the IaC commands. In embodiments, the removal of the probe is based on rules, e.g., after a predefined period of time lapses.

In embodiments, in response to collecting the performance data, the probe module 430 builds a machine learning model to mimic performance of the cloud application of the cloud applications 465, 465*n* at runtime. In embodiments, the machine learning model is a non-linear or linear regression model with a response time dependent variable. In embodiments, the machine learning model includes a regression coefficient bn as a predictor multiplier with the potential CPU utilization of a new cloud deployment.

In embodiments, the probe module 430 uses the resource consumption values r1 . . . rn and the performance data values as training data in the machine learning model. In this way, the probe module 430 trains the machine learning model using the performance data values pn. Specifically, the probe module 430 uses the rn and pn values as training data for the machine learning model to create the function f(r1, r2, . . . rn). More specifically, the probe module 430 feeds the rn and pn values as inputs into the machine learning model. In embodiments, the machine learning model is shown as I=f(r1, r2, . . . rn).

In embodiments, the probe module 430 determines whether the machine learning model is accurate. Specifically, the probe module 430 uses the machine learning model to predict performance data at relatively higher resource consumption values. As an example, the probe module 430 increases the resource consumption value rn with respect to the threshold value. As an example, the probe module 430 increases the resource consumption value on the probe 470 to be equal to one-half the threshold value. In embodiments, the probe module 430 compares the performance value from the machine learning model to the performance data from the cloud application 465. In response to a match, the probe module 430 determines that the machine learning model I=f(r1, r2, . . . rn) is accurate, designating the machine learning model as I_A=f(r1, r2, . . . rn), with I representing an impact the resource consumption values r1, r2, . . . rn have on a cloud application of the cloud applications 465, 465n. In this way, the probe module 430 determines whether the machine learning model is accurate using relatively higher resource consumption values.

In embodiments, in response to determining that the machine learning model is accurate, the probe module 430 will use the accurate machine learning model I_A=f(r1, r2, . . . rn) to predict the impact of deploying new cloud applications on an existing cloud application on a virtual machine without having to deploy a probe to the virtual machines 460, 460n. As an example, the probe module 430 uses the resource consumption values defined in an SLA of a new cloud application into the machine learning model to predict an impact of the new cloud application on the existing cloud application. In embodiments, in response to the performance value from the machine learning model not matching the performance data from the cloud application 465, the probe module 430 will deploy a probe of the probes 470, 470n to a virtual machine of the virtual machines 460, 460n again to collect performance data from the cloud application 465.

FIG. 5 shows a flowchart of an exemplary method in accordance with aspects of the present invention. Steps of the method may be carried out in the environment of FIG. 4 and are described with reference to elements depicted in FIG. 4.

At step 505, the system generates a probe. In embodiments, and as described with respect to FIG. 4, the probe module 430 generates a probe using a service level agreement (SLA) of a cloud application a cloud operator desires to deploy in the cloud environment 450.

At step 510, the system deploys the probe into a virtual machine hosting a cloud application. In embodiments, and as described with respect to FIG. 4, the probe module 430 deploys a probe of the probes 470, 470n into a virtual machine of the virtual machines 460 through the network 410.

At step 515, the system increases resource consumption by the probe. In embodiments, and as described with respect to FIG. 4, the probe module 430 increases the resource consumption values r1 . . . rn by a probe of the probes 470, 470n incrementally until a threshold is met, i.e., rn=resource consumption threshold. In embodiments, the threshold is a percentage of a resource consumption value defined in a service level agreement (SLA).

At step 520, the system collects performance data from the cloud application. In embodiments, and as described with respect to FIG. 4, the probe module 430 collects performance data from a cloud application of the cloud applications 465, 465n through a web-based API.

At step 525, the system trains a machine learning model using the performance data. In embodiments, and as described with respect to FIG. 4, the probe module 430 uses the resource consumption values (rn) and performance data values (pn) of a cloud application of the cloud applications 465 to train the machine learning model to create the function f(r1, r2, . . . rn). In embodiments, the machine learning model is shown as I=f(r1, r2, . . . rn).

At step 530, the system predicts performance of the cloud application in response to a new cloud application deployment using the machine learning model. In embodiments, and as described with respect to FIG. 4, the probe module 430 uses the resource consumption values defined in an SLA of a new cloud application into the machine learning model to predict an impact of the new cloud application on the existing cloud application of the cloud applications 465, 465n.

Figure 6:
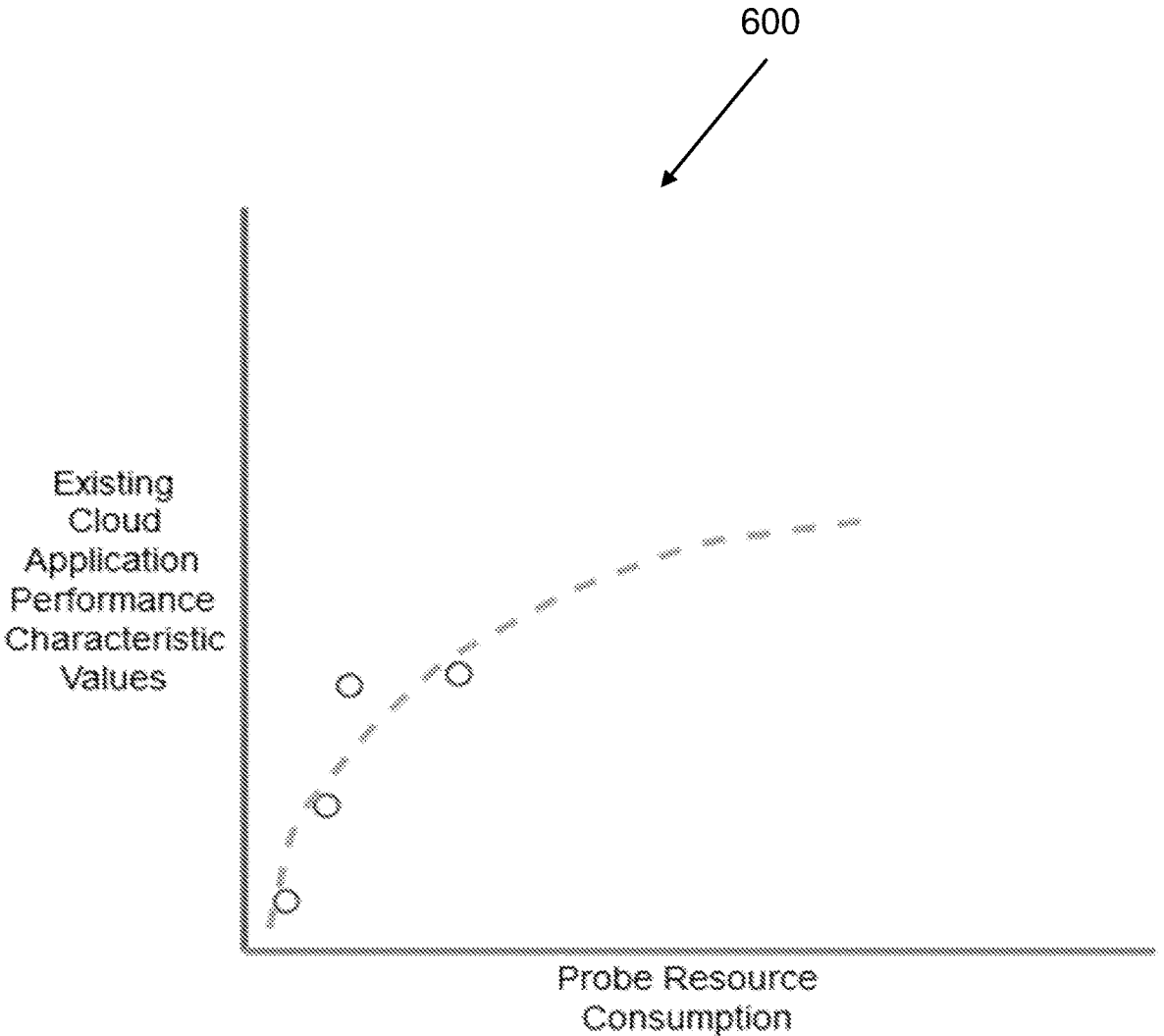
FIG. 6 shows an exemplary use of a machine learning model in accordance with aspects of the invention.

FIG. 6 shows an exemplary use in accordance with aspects of the present invention and is described with reference to elements depicted in FIG. 4. In embodiments, FIG. 6 illustrates a machine learning model 600. Specifically, FIG. 6 shows an example of collected resource consumption values (rn) of a probe of the probes 470, 470n and the performance data values (pn) of a cloud application of the cloud applications 465, 465n to build a nonlinear regression model. In embodiments, the machine learning model uses a regression coefficient as a predictor multiplier with a potential CPU utilization of a new cloud deployment. In embodiments, the machine learning model 600 predicts an impact on a response time of a cloud application of the cloud applications 465, 465n depending on how much resource consumption a potential cloud application uses of a virtual machine of the virtual machines 460, 460n. In embodiments, the resource consumption values of the new application are b1, b2, . . . bn, so that the machine learning model 600 is also shown as I_A=f(b1, b2 . . . bn).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

generating, by a computing device, a probe mimicking a cloud application with a set of performance parameters by adjusting software representing the probe to have the set of performance parameters;

deploying, by the computing device, the probe into a virtual machine hosting the cloud application, wherein the probe mimics the runtime of the cloud application and consumes a lower level of resources than required for a set of microservices to run the cloud application on the virtual machine;

incrementally increasing, by the computing device, resource consumption values by the probe by a predetermined amount at predetermined time intervals until a predetermined threshold of a probe resource consumption is attained;

collecting, by the computing device, performance data associated with the set of performance parameters from the cloud application at each of the predetermined time intervals; and training, by the computing device, a machine learning model using the performance data.

2. The method of claim 1, wherein the machine learning model is a non-linear regression model.

3. The method of claim 1, wherein the machine learning model is a linear regression model.

4. The method of claim 1, further comprising deploying the probe using Infrastructure-as-Code (IaC) commands.

5. The method of claim 1, further comprising removing the probe from the virtual machine.

6. The method of claim 1, further comprising removing the probe from the virtual machine using IaC commands.

7. The method of claim 1, further comprising removing the probe from the virtual machine based on a predefined period of time lapsing.

8. The method of claim 1, further comprising deploying the probe based on a predefined period of time lapsing.

9. The method of claim 1, wherein the threshold is a percentage of a resource consumption value defined in a service level agreement (SLA).

10. The method of claim 1, wherein the computing device includes software provided as a service in a cloud environment.

11. A computer program product comprising one or more computer readable storage media having program instructions collectively stored on the one or more computer readable storage media, the program instructions executable to:

generate a probe mimicking a cloud application with a set of performance parameters by adjusting software representing the probe to have the set of performance parameters;

deploy the probe into a virtual machine hosting the cloud application, wherein the probe mimics the runtime of the cloud application and consume a lower level of resources than required for a set of microservices to run the cloud application on the virtual machine;

incrementally increase resource consumption values by the probe by a predetermined amount at predetermined time intervals until a predetermined threshold of a probe resource consumption is attained;

collect performance data associated with the set of performance parameters from the cloud application at each of the predetermined time intervals;

train a machine learning model using the performance data; and predict performance of the cloud application in response to a new cloud application deployment using the machine learning model.

12. The computer program product of claim 11, wherein the program instructions are further executable to remove the probe from the virtual machine using IaC commands.

13. The computer program product of claim 11, wherein the program instructions are further executable to deploy the probe using IaC commands.

14. A system comprising:

a processor, a computer readable memory, one or more computer readable storage media, and program instructions collectively stored on the one or more computer readable storage media, the program instructions executable to:

generate a probe mimicking a cloud application with a set of performance parameters by adjusting software representing the probe to have the set of performance parameters;

deploy the probe into a virtual machine hosting the cloud application, wherein the probe mimics the runtime of the cloud application and consume a lower level of resources than required for a set of microservices to run the cloud application on the virtual machine;

incrementally increase resource consumption values by the probe by a predetermined amount at predetermined time intervals until a predetermined threshold of a probe resource consumption is attained;

collect performance data associated with the set of performance parameters from the cloud application at each of the predetermined time intervals;

remove the probe from the virtual machine;

train a machine learning model using the performance data; and predict performance of the cloud application in response to a new cloud application deployment using the machine learning model.

15. The system of claim 14, wherein the probe is removed using IaC commands.

16. The system of claim 14, wherein the machine learning model is a non-linear regression model.

17. The system of claim 14, wherein the machine learning model is a linear regression model.

* * * * *